United States Patent [19]

Kievit et al.

[11] 3,803,557

[45] Apr. 9, 1974

[54] EXPEDITOR DATA DISSEMINATION AND DISPLAY SYSTEM

[75] Inventors: James Marshall Kievit, Des Plaines; James L. Howe, Chicago, both of Ill.

[73] Assignee: A. B. Dick Company, Chicago, Ill.

[22] Filed: May 14, 1971

[21] Appl. No.: 143,531

[52] U.S. Cl. .......................................... 340/172.5

[51] Int. Cl. .......................... G06f 3/14, G06f 15/24

[58] Field of Search ................ 340/172.5, 147, 151,

[56] References Cited

UNITED STATES PATENTS

| | | | |
|---|---|---|---|
| 3,541,519 | 11/1970 | Thompson | 340/172.5 |
| 3,623,003 | 11/1971 | Hewitt | 340/172.5 |
| 3,653,000 | 3/1972 | Kielar et al. | 340/172.5 |
| 3,688,276 | 8/1972 | Quinn | 340/172.5 |
| 3,573,739 | 4/1971 | Zeitlin | 340/172.5 |
| 3,181,124 | 4/1965 | Hammel | 340/172.5 |
| 3,281,797 | 10/1966 | Harris | 340/172.5 |
| 3,308,439 | 3/1967 | Tink et al. | 340/172.5 |
| 3,323,119 | 5/1967 | Barcomb et al. | 340/172.5 X |
| 3,341,820 | 9/1967 | Grillmeier, Jr. et al. | 340/172.5 |
| 3,407,387 | 10/1968 | Looschen et al. | 340/172.5 X |
| 3,566,365 | 2/1971 | Rawson et al. | 340/172.5 |
| 3,571,802 | 3/1971 | Serra | 340/172.5 |
| 3,581,289 | 5/1971 | Wilhelm et al. | 340/172.5 |

*Primary Examiner*—Paul J. Henon
*Assistant Examiner*—Melvin B. Chapnick
*Attorney, Agent, or Firm*—Lindenberg, Freilich & Wasserman

[57] ABSTRACT

In a manufacturing facility a centrally located computer has information entered, using, a keyboard into memory, at an address determined by a department number. The information relates to part shortages or other manufacturing data, indicating the manufacturing responsibility of each department in the plant. On signal, the computer sends the data for each department, using the department number as the address, to a display control means at each department which stores the data relevant to that department. One or more monitors are at each department, and display the data stored in the display control means for that department.

12 Claims, 2 Drawing Figures

INVENTORS
JAMES MARSHALL KIEVIT
JAMES L. HOWE
BY Lindenberg, Freilich & Wasserman
ATTORNEYS INVENTORS
JAMES MARSHALL KIEVIT
JAMES L. HOWE
BY Lindenberg, Freilich & Wasserman
ATTORNEYS

EXPEDITOR DATA DISSEMINATION AND DISPLAY SYSTEM

BACKGROUND OF THE INVENTION

This invention relates to computer controlled display systems and more particularly to an improvement therein.

In factories where the apparatus which is manufactured is made up of components produced by a number of departments, usually some form of scheduling is established in order to enable successive fabrications to occur without delays due to part shortage. It is well known that despite the best of scheduling, scheduled dates are not always met on time for one reason or another. As a result, meetings are held by the foremen of the various departments anywhere from two to five times a week in order to learn what situation is in the various departments and to make plans in order to avoid having departmental shut-downs because of failure to deliver critically needed parts.

The frequent meetings to disseminate the information as to the critically needed parts based upon which the various department foremen can determine whether to get more help, or to work overtime or stop the production of one part for which the need is not critical and start the production of another, comprises a large waste of managerial time and money. Clerical help is required for typing and distributing the information generated at these meetings to the various expeditors and other help who are guided accordingly.

OBJECTS AND SUMMARY OF THE INVENTION

An object of this invention is to present a system which rapidly disseminates control information relating to critical part shortages to the areas where needed.

Another object of the present invention is to provide a computer controlled display system for disseminating control information.

Still another object of this invention is to provide a system which displays different data at different locations which data is relevant only to the operation of each location.

Yet, another object of the present invention is to provide a novel and useful control information disseminating system.

These and other objects of the invention are achieved in an arrangement wherein, by way of example, at a central location, information relating to the production control requirements applicable to each of the departments involved is entered into a computer. External peripheral equipment is provided connected to monitors at each of the departments. The information entered into the computer, is processed so that it may be properly displayed, and then is stored in memory. It is read out to external peripheral equipment which includes a memory for each department monitor. The external peripheral equipment, in response to the department address information, steers the data read out of the computer memory to the memory for the department where it is stored and then read out continuously and displayed by the display monitor or monitors, in the department to which that information pertains.

Provision is made for updating the information when required.

The novel features of the invention are set forth with particularity in the appended claims. The invention will best be understood from the following description when read in conjunction with the accompanying drawings.

DESCRIPTION OF THE PREFERRED EMBODIMENT

Figure 1A:
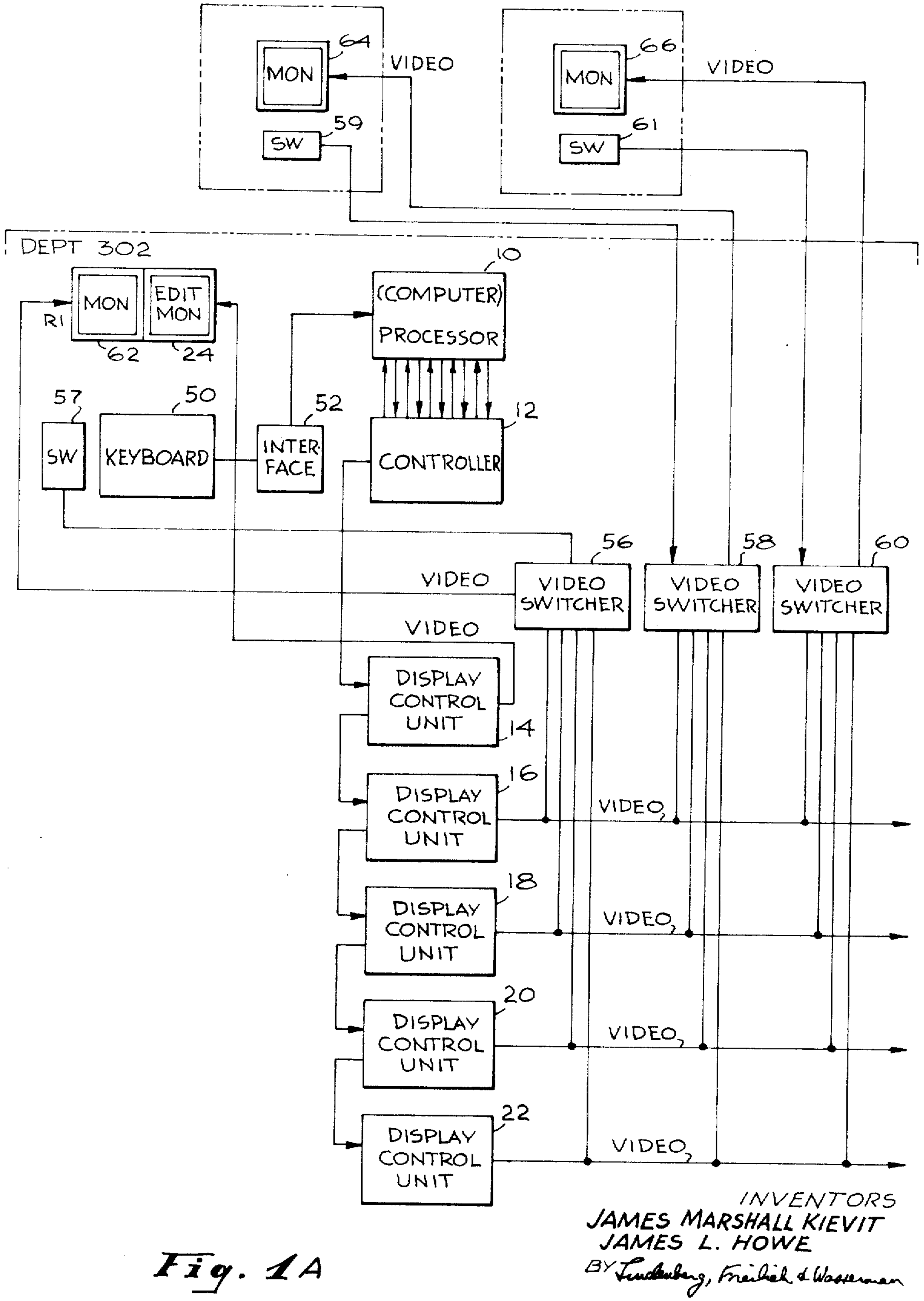
FIG. 1A and FIG. 1B are block diagrams of an embodiment of the invention.
Figure 1B:
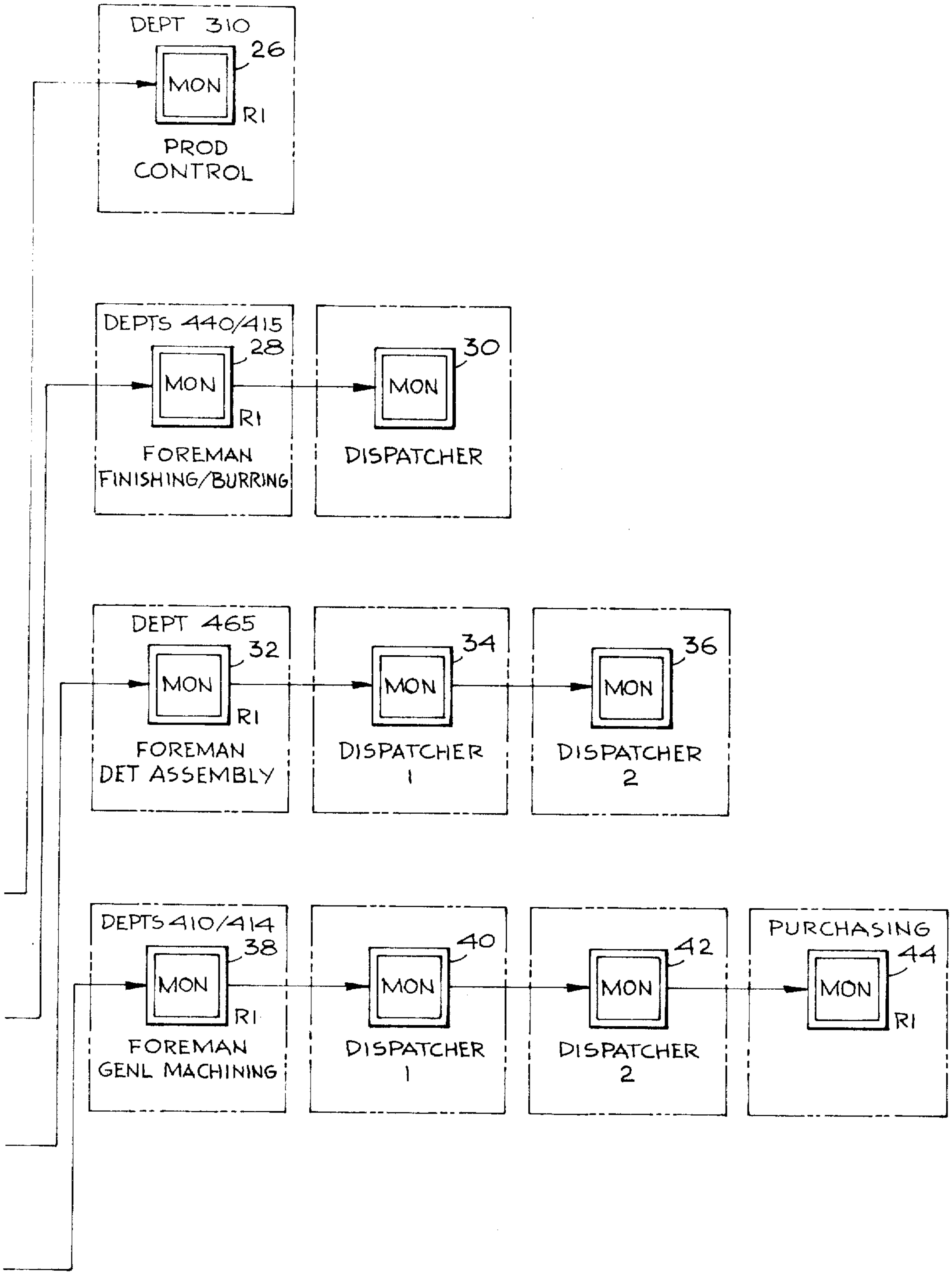

Referring now to FIGS. 1A and 1B, there may be seen a block diagram of an embodiment of the invention. The expeditor system shown therein comprises a communications network combining computer and closed circuit television techniques whereby a selective list of critical parts, with pertinent information relating their schedule requirements, is continuously and automatically displayed on television monitors at strategic locations. These locations are in the main areas which control the progress of the critical parts displayed. Control of the system is physically located in a chief dispatcher's office and the required input information is essentially available from the existing shop floor control system.

The system described herein constitutes an actual and operative installation. However, it will be appreciated by those skilled in the art that this is illustrative only and that other arrangements of the system, may be used without departing from the spirit and scope of this invention.

Department 302 exemplifies a designation of the location of the control center wherein the electronic equipment for processing and distributing information is located. This equipment comprises a general purpose computer 10, which, by way of example, may be of the type manufactured by Varian Data Machines, a subsidiary of Varian Corporation, located at 2722 Michelson Dr., Irvine, Calif., which is called the Varian Data 620/*i*. The computer can communicate with a controller 12. The controller connects to a plurality of display control units, here exemplified by control units 14, 16, 18, 20 and 22. Display control unit 14 has associated therewith an editing monitor 24, located at the control center, which displays information stored in the memory of the display control unit 14. Display control unit 16 stores and controls the information displayed on a monitor 26, which is physically located in a department 310, indicated as the production control department. Display control unit 18 stores and determines the information which is displayed on monitors 28 and 30. These monitors are respectively located in Departments 440 and 415, which are respectively locations at which the foremen of the finishing and burring department are situated and also is the location at which the dispatcher for that department is located.

Display control unit 20 stores and provides the video information displayed on monitors 32, 34, and 36, which are respectively located at the foreman position and the positions of two dispatchers of Department 465, which is concerned with an assembly process.

Display control unit 22 stores and is concerned with providing the video information displayed on monitors 38, 40, and 42, and 44. These are at the locations of the foreman in charge of the general machining process, the respective two dispatchers for that department, and also for the purchasing department.

Each display control unit stores only data to be displayed on its associated monitors. This data is relevant only to the department in which the monitor is located. The data stored in each display control unit memory is obtained from the computer memory, as will be described. In summary therefore while the computer memory stores all of the data which is being displayed, each display control unit stores only the data to be displayed in the particular department with which it is associated.

A display control unit and its associated monitor, or monitors, of a type suitable for employment herein is described and claimed in Pat. No. 3,582,936. Also, another suitable system is described in Pat. No. 3,593,310. Each of these display systems includes a display control unit which includes a memory into which data is entered from any suitable data source, such as a keyboard, or over a line from a data source, or from tape. The information in the memory is continuously read and restored until altered by a new input. The address of the input to memory as well as the location at which it will be displayed is determined by circuitry which places a cursor marker on the display tube at the location at which a character is displayed and/or entered into memory. There is a correspondence between memory address and display location on the face of the monitor. The display control unit also contains a character generator which converts the digital information read from memory into video information. Finally, the display control unit also contains circuitry which when actuated can cause a desired character or characters to flash on and off so that attention is called to them and can cause the data display to roll upward from bottom to top on the monitor so that additional information may be entered into the memory at the bottom and displayed upwardly across the face of the monitor.

Back at the control center, data is entered into the system by means of a keyboard 50. This data is first displayed on the edit monitor 24. The output of the keyboard through well known computer interface circuitry 52, is entered into the computer 10 for processing and thereafter is applied through controller 12 to a display control unit 14. The display control unit 14 is associated with and controls the display on the edit monitor 24. Also, at the control center, are selector switches respectively 56, 58, and 60. The selector switch 56 connects to each one of the video outputs from display control units 16 through 22 and can be actuated, via manual switch 57, to select one of the display control unit video output and display it on the monitor 62. Selector switch 58 can be manually actuated by means of a switch control 59 to select the video being provided by any one of display control units 16 through 22 to be displayed on a monitor 64. This monitor is in the Administration Department. A switch 61 can be manually actuated to direct the selector switch 60 to select one of the video outputs from display control units 16 through 22 and display the selected video on a monitor 66, which is at the Equipment Assembly Department.

A controller, such as controller 12 acts as an interface between display control units and a general purpose computer. It enables a general purpose computer to selectively address and send data to, and receive data from, a plurality of peripheral equipment. A controller of a type suitable for use with this invention is shown and described in a Pat. No. 3,715,725 for Kievit et al., *Address Responsive Controller For Computer Handling of Peripheral Equipment.* The system described illustrates how a computer, be a first level address, can selectively address any one of a plurality of controllers, each of which are coupled to a plurality of peripheral devices. The selected controller can then, using a second level address provided by the computer, select the desired one of the peripheral devices associated therewith. These may be display systems of the type described herein. The selected peripheral device then can receive data from the computer or can provide the computer with data as specified by the computer. The selected peripheral device tests the coded data which it receives by any suitable code checking mechanism such as a parity check and can send back signals to the controller that the received data is acceptable, or if it is not may request a retransmission.

Shown in this application is a single controller 12, which can direct data to an addressed one of a plurality of display systems. However, it should be understood that the use of a single controller and associated display devices is exemplary. Where required a plurality of controllers and their associated display devices may be employed without departing from the spirit and scope of this invention.

The program which the computer performs in operation within the system being described is quite straightforward and will become clear as this description progresses. Such program is entered into the computer in the usual manner, as by perforated tape read by a Teletype or by any other tape reader, into the computer.

The computer memory is organized so that a different section thereof is assigned to each different department. However, the assignment is done on a dynamic basis, i.e., so as to be continually changing as the operator converses with the computer. That is, the amount of memory space allocated to each department may be increased or decreased in accordance with the data needs of the department.

The display for each different department is stored in the assigned section of the memory. The department number is assigned to the address of that section of the memory and also assigned to the address of the display control unit which controls the displays for that particular department.

The memory not only stores the list of department numbers but also stores a list of part numbers, as well as the headings for a display. The display format for all monitors in the present system is identical and includes headings which are displayed statically across the top line of all monitors. By way of illustration, and not to serve as a limitation upon the invention, a typical display on one of the monitors at a department is reproduced below.

| Part No. | LOT | QTY | 0 | DTE&TOA | DU | TO |
|---|---|---|---|---|---|---|
| 72033 | 602 | 200 | 3 | 011211A | 14 | AUD |
| 72145 | 592 | 30C | 2 | 010804P | 14 | 465 |
| 73974 | 448 | 450 | 1 | 122809A | 13 | 414 |
| 74855 | 415 | 375 | 3 | 010807P | 15 | 465 |
| 78550 | 659 | 10C | 3 | 010604A | 14 | AUD |
| 82543 | 601 | 880 | 3 | 010505P | 14 | 465 |
| 84657 | 685 | 250 | 1 | 010811A | 15 | AUD |
| 88256 | 635 | 50 | 4 | 010410A | 17 | 465 |

The foregoing is not a total display since a total display can include 15 active entries in a static mode and more than that can be accommodated by causing the information being displayed to roll from the bottom to the top of the monitor at a continuous preset rate, in the manner described in a previously mentioned Kievit patent application.

The heading from left to right includes a listing of required part numbers and adjacent thereto the lot number. Then the quantity required is under the heading "QTY". The letters C or M under quantity represent 100 or 1,000.

The 0 heading has thereunder the number of machine operations remaining to be completed on the release in the department. The DTE&TOA provides thereunder for the numerical date and time of arrival of the release in the department.

The letters DU indicate the day of the month completion of the release in the department is required. Finally, the letters TO indicate the department receiving the part after completion.

Entry and deletion of data is preformed by the interaction between the program and operator using the keyboard 50 and its associated edit monitor 24. The edit monitor 24 always displays the headings and the data typed on the keyboard for entry into the computer 10. Corrections of an entry before posting is done by means of a cursor which is a bright line or circle indicating where the next character which is typed will be entered. Though the monitor is capable of responding to the cursor being moved to any location on the face of the display tube by actuating cursor left or cursor right keys on the typewriter, in the preferred program the cursor is only moved left for replacing a character. By placing the cursor at the location of the character desired to be erased, erasure occurs simply by depressing the key on the keyboard with the correct character whereby the character previously there is replaced. Operation of the cursor is also explained in the previously indicated Kievit application.

Unitl a new command and department number has been entered, the last entry to the system will be displayed by the edit monitor. This old information is erased and new information is displayed as entered. If desired, the computer can be programmed to display requests for the next information which is to be entered therein. Thus, initially the edit monitor will display the words COMMAND. If operator types "I" in response to this, the word "INSERT" appears after COMMAND in response and on the next line "DEPT" appears as the next information request. The department number is then typed on the keyboard. This is displayed by the edit monitor next to the word "DEPT" as typed.

If the display indicates that the department number has been correctly typed, then a "NEW LINE" key is actuated. The program compares the department number to the list of department numbers it has stored, and if it finds that the typed department number is incorrect, it will display on the monitor "No such department". This can be corrected only by restoring, i.e., actuating the erase key, start with "INSERT" and then retyping.

The display will, if the department number is correct, continue to display such department number throughout the making of entries. It will next display "Part Number," indicative of the next piece of information required. The part number may be a six digit part number as a maximum. This is displayed on the monitor below the location where the other information is displayed. Upon actuation of the new line key the computer will store the part number in memory and it will shift to its correct place under the "Part Number" heading.

The display will then display the work "Lot." This calls for the keyboard to be actuated to indicate the lot number. This is a maximum three digit lot number. Actuation of the "New Line" key causes this lot number to be stored in memory and displayed at its proper location. Should a part number or a lot number be a duplicate of part and lot numbers already in memory for a particular department then the program will instruct the edit monitor to display "Duplicate Entry" and the entry already existing in memory for this "Dept," "Part" and "Lot" will be displayed to the operator. In this event a new entry must be made.

After the log number has been posted in response to a "MODE" request, if it is desired to cause attention to be drawn thereto, a typewriter key designated "F" for flash may be actuated to cause the flickering of the part and lot numbers, or "N" for normal display. If neither of these is pushed, the display will be in the normal or static mode.

The next set of letters displayed for entry will by "QTY." In response to this a three-character entry is made using the letters C and M respectively 100'indicate 100's or 1,000's. The "New Line" key is then actuated to transfer the quantity into the computer memory and also to display it at the proper location under the heading on the edit monitor.

The monitor next displays the "0" designation. A one digit number is then entered representing the operations to be completed. Upon the "New Line" key being actuated this number is entered into the computer memory.

The "DTE&TOA" is next displayed. In response to this a maximum two digit number is entered for the month and a two digit number is entered for the day. Also a two digit number is entered for the time, followed by a P or an A for PM or AM. This data is then posted by actuating the "New Line" key with results similar to those described.

The "DU" symbol is next displayed, in response to which a two digit number is typed into the computer, and thereafter posted by the "New Line" key. Finally, the "TO" designation is displayed, in response to which a three character entry, maximum is typed and posted thereafter by actuation of the "New Line" key.

Entry of the data just described is displayed on the edit monitor and not on any of the departmental monitors until the data in the section of the memory associated with that department is edited by the program which is entered into when the "SEND MESSAGE" key is actuated.

Upon completion of the posting and actuation of the "SEND MESSAGE" key, the computer goes through a simple sort routine comparing the part number of the data just entered with the part numbers previously stored for the particular department and inserting in its proper place in memory in the information which has been previously stored, the part number and its associated data so that part numbers are displayed in numerically ascending fashion from the top of the monitor down to the bottom. The contents of the section of the memory associated with the department are then read out of the computer memory and directed by the controller to the one of the display control units which is associated with that particular department. The display control unit then enters the data into its memory in place of the data which it had previously stored. The display control unit then causes the monitor to display this data. A check on the data being displayed may be made by the monitor 62 by actuating the switch 57 so that the video switcher 56 selects the video for the particular department desired to be monitored.

The display, program and the computer may have a roll mode option which enables more than 15 entries to be displayed upon a monitor. Upon entry of a 16th or greater entry, the display, instead of being in single spaced format in a static mode is automatically double spaced and "rolled" at a continuous preset rate from the bottom of the monitors to a point below the static header line. A blank line will be displayed between the last line of each list and its beginning. Deletion of entries below 16 will automatically restore the static single spaced format. A switch may be provided at each monitor station to permit the roll function to be temporarily interrupted at any point in the roll cycle in order to stop the display for longer examination.

In order to delete an existing item first a "D" key for "Delete" is actuated. Then, the department number is entered followed by the part number and lot number, if it is required to uniquely identify the entry. Upon posting of the lot number by the "New Line" key as previously indicated, the program searches its memory, finds the part and lot number which equals the one just entered and displays the entry on the edit monitor. Upon actuation of the "Send Message" key the program deletes the entire line, and then moves up the information below that line so that no blank space will be displayed. Thereafter, the information in the section of memory wherein the delete operation has occurred, is sent to the display control unit which controls the monitors for the particular department in question. The edited data is entered in place of the data in that memory, which is thereafter displayed on the monitors.

If it is desired to change any portion or all of the information other than the part number and lot number being displayed on a line, then, a "C" key is actuated on the typewriter. Thereafter the steps of the procedure gone through are the same as for the "insert" routine with the present information being displayed on the edit monitor. When the "Send Message" key is actuated the computer finds the part corresponding to the part just entered and substitutes the just entered information in place of the information on that line in the memory. Thereafter, the computer sends the information through the controller to the particular display control unit concerned wherein the information in the computer memory for that particular department is read out and replaces the data stored in the memory at the display control.

From the foregoing it will be seen that the program of routines which the computer performs in response to actuation of keys on the typewriter keyboard are those found with any general purpose computer, such as sort, read information into memory at a particular address, read information out of memory from a particular address or read all the information from the memory, substitute information, etc.

From the foregoing description it will be apparent that a system has been described wherein information may be disseminated to all the areas of a facility, exemplified by a manufacturing facility, whereby the time wasted in determining either daily or at some shorter interval when needed parts will arrive is eliminated so that the proper scheduling of the manufacturing may be most efficiently and economically achieved. The system provides "department channels," so that only information relevant to a department is displayed at that department.

While the invention has been described in connection with a manufacturing facility, the applications of the invention, such as to a hospital facility, or a school facility should be apparent and do not depart from the spirit and scope of the claims. The system may be easily expanded to handle larger facilities than the one shown by the expedient of adding another controller and additional display devices while making provision by proper programming to handle the additional "department channels."

What is claimed is:

1. A system for displaying data at a plurality of locations comprising:

display control means for each location including one or more display monitors and a display control unit for said monitors, said display control unit having storage means for storing data which is displayed on said monitors, said display control unit being identifiable by an address and including means responsive to said address for enabling the entry of data into storage means, means for selectively providing the data stored in a memory storage means of a predetermined one of said display control units including computer means at a central location having a computer memory means with different sections thereof assigned for the storage of data destined for storage into a different one of said display control means, each section of said computer memory means having a separate address, keyboard means at said central location at said control location for addressing a desired section of said memory means and entering data therein, said keyboard means including means for generating a send message signal, and means in said computer means responsive to said send message signal for transferring the data stored in a section of the computer memory means into the memory means of a diaplay control unit whose address corresponds to the address of said section of computer memory.

2. A data display system comprising:

a plurality of data display monitors, one or more of said monitors being at different locations, a plurality of display control means for controlling one or more of said display monitors assigned to different locations, each display control means being associated with the display monitors at a different location, each display control means having a display memory means for storing the data displayed on its associated data display monitors, each display control means being identifiable by an address and having means responsive to said address for enabling the entry of data into its display memory means, keyboard means at a central location for generating address signals corresponding to desired display control means, data signals and insert, delete, change and send message instruction signals, programmed computer memory means at said central location responsive to an insert instruction signal, an address signal, and data signals from said keyboard means for storing said address signals and said data signals at an address in said programmed computer memory means indicated by said address signals, and including means responsive to a send message signal from said keyboard means for reading out of said computer memory means, said address signals and said data signals stored at said address in said computer memory means, and controller means for applying said address signals and said data signals read out from said computer memory means to all of said display control means whereby said data signals are stored in the display memory means of the display control means identified by said address signals and the data signals are thereafter displayed by its associated data display monitors.

3. A data display system as recited in claim 2 wherein one of said display control means and one of said data display monitors controlled thereby is at the location of said keyboard means, there is included means for entering into the memory means of said one of said display control means from said programmed computer memory means data signals as they are generated by said keyboard means to be displayed by said one of said data display means, means in said programmed memory means responsive to erroneous address data being generated by said keyboard means for producing signals indicative of said erroneous address data, and means for applying said signals indicative of said erroneous address data to said one data display control means to be displayed by said one data display means.

4. A data display system as recited in claim 2 wherein said keyboard means generates delete, address and send message instruction signals, and delete data signals indicative of the portion of the data signals stored at the address location in memory which it is desired to delete, said programmed computer memory means includes means responsive to said delete, address and delete data signals for deleting at said address in memory said portion of the stored data signals indicated by said data signals to leave remaining data, and said means responsive to said send message signals reads out of said computer memory means, said address and said remaining data signals for application of said controller means to all of said display control means but storage of said remaining data signals only in the memory means of a display control means identified by said address.

5. A data display system as recited in claim 2 wherein said keyboard means generates change, address and send message instruction signals, and new data signals indicative of the data signals desired to be stored in place of data signals already stored in said computer memory means, said programmed computer memory means includes means responsive to said change, address and new data signals for storing the new data signals in place of data signals already stored, and said means responsive to said send message signals reads out of said programmed computer memory means, said address signals and said new data signals for application by said controller means to all of said display control means and storage of said data in the memory means of a display control means identified by said address.

6. A data display system as recited in claim 2 wherein there is at said central location a data display monitor, a display control means at said central location for said monitor, and means for entering into the display memory means of said display control means at said central location the address signals and data signals generated by said keyboard means to be displayed by said data display monitor at said central location before said keyboard means generates a send message signal.

7. A data display system as recited in claim 2 wherein one of said display control means and one of said data display monitors controlled thereby is at the location of said keyboard means, the data signals generated by said keyboard means are to be generated in sets in a predetermined order of sets, said programmable computer memory means includes means responsive to one set of data signals for generating signals indicative of the next set of data signals in said predetermined order of sets, and means for applying said signals indicative of the next set of data signals to said one of said display control means to be displayed on said one of said data display means.

8. A data display system comprising:

keyboard means, at a central location, for generating insert, computer memory and display address, and send message instruction signals, and data signals, programmed computer memory means having means in response to insert and computer memory address signals for storing said display address signals and data signals at the address indicated by said computer memory address, and means in response to send message instruction signals for reading out data and display memory signals stored at said address indicated by said computer memory address signals, a plurality of data display monitors, at different locations, a display control means for each location for controlling the display on the data display monitors at each location, each display control means having a memory means for storing the data displayed on said monitors, each display control means being identifiable by a display address and including means responsive to said display address for enabling the entry of data into its memory, and means for applying the display address and data signal readout of said programmed computer memory means to all of said display control means whereby said data will be entered into the memory means of the display control means identifiable by said display address.

9. A data display system comprising:

a plurality of data display monitors, one or more monitors being at a different location, a display control means for each location for controlling the display of one or more monitors at each location, each display control means being associated with the data display monitors at each location, each display control means having a memory means for storing the data displayed on its associated data display monitors, and each display control means being identifiable by a display address and having means responsive to said display address for enabling the entry of data into its memory means, a source of data for each of the memory means of the display control means including a central memory means having different separately addressable sections identified by the display address of a display control means for storing data for display at each of said different locations said central memory means having means responsive to an insert signal and to a display address signal representing the address of a memory means section and the address of a display control means for entering said display address signal and data into the addressed section of said central memory means, means responsive to a send message signal for reading the display address signal and the data stored in the section just addressed out of said central memory means, keyboard means for generating the display address signal of a display control means, data signals and instruction signals, means for applying the signals generated by said keyboard means to said central memory means, and means for transmitting the address signals and data signals read out of said central memory means to all of said display control means whereby said data will be read into the memory means of the display control means identified by said address signals.

10. A data display system as recited in claim 9 wherein there is one of said display control means and one of said data display monitors controlled thereby at the location of said keyboard means, there is included means for entering into the memory of said one of said data display means from said computer memory means data signals as they are generated by said keyboard means, means in said programmed memory means responsive to erroneous address data being generated by said keyboard means for producing signals indicative of said erroneous address data, and means for applying said signals indicative of said erroneous address data to said one of said display control means to be displayed by said one of said data display monitors.

11. A data display system as recited in claim 9 wherein one of said display control means and one of said data display means controlled thereby it at the location of said keyboard means, the data signals generated by said keyboard means are to be generated in sets in a predetermined order of sets, said programmable computer memory means includes means responsive to one set of data signals for generating signals indicative of the next set of data signals in said predetermined order of sets, and means for applying said signals indicative of the next set of data signals to said one of said display control means to be displayed on said one of said data display means.

12. A display system comprising:

central memory means for storing in different separately addressable sections thereof data to be displayed at different locations, a data display monitor at each different location, each monitor having a display memory means for storing the data displayed by an associated data display monitor, one or more data display monitors at each different location, keyboard means at the location of said central memory means for generating signals indicating out of which of said separately addressable sections of said central memory means data is to be read out and into which of the display memory means said read out data is to be entered, means for applying said keyboard signals to said central memory means, and means for applying data signals read out of said central memory means to the display memory means of the display monitor designated by the signals generated by said keyboard means.

* * * * *